3,275,527
METHOD OF DETERMINATION OF THE CONTENT OF MICROORGANISMS IN AIR
Karl Heinrich Maier and Knut Voggel, Gottingen, Germany, assignors to Fa. Membranfilter-Gesellschaft G.m.b.H., Gottingen, Germany, a corporation of Germany
No Drawing. Filed Jan. 28, 1963, Ser. No. 254,423
8 Claims. (Cl. 195—103.5)

This application is a continuation-in-part application of copending application Serial No. 31,287, filed May 24, 1960, and now abandoned.

The present invention relates to the determination of the microorganism content of the atmosphere, more particularly, to the determination of the microorganism content of air by filtering the air through a microporous air-permeable and water-soluble membrane upon which the microorganisms are accumulated.

In the outdoor atmosphere, as well as in enclosures occupied by large numbers of people, such as hospitals, schools and public buildings, the air therein comprises dust particles and also microorganisms of all types such as bacteria, viruses, fungi and the like. Various methods have been devised in order to determine the microorganism content of the air in such atmospheres. These methods generally operate in accordance with the konimeter or impinger principles. In addition, the microorganism content of the air has been determined by filtering of the air, but this process has been used to a limited extent.

It is desirable to determine the microorganism content of air by filtering the air since this process enables one to obtain a selectively strong accumulation of microorganisms. It was, therefore, suggested to employ cellulose ester membrane filters which were found suitable for the filtering of liquid media in order to filter the air whereby the microorganisms could be accumulated from the air on the membrane. It was, however, disappointing to find that these membrane filters were not at all satisfactory for determining the microorganism content of air. It was found that microorganisms which were accumulated on commercially available membrane filters made of cellulose esters did not satisfactorily survive and it was rather difficult to obtain cultures from these microorganisms. Since these microorganisms which accumulated on the cellulose ester membranes could only be cultivated in such small numbers, completely inaccurate results were obtained with respect to the microorganism content of the air. It was believed that these unfavorable results from the use of cellulose ester membranes were due to the hydrophobic characteristics of the membrane which favored the drying out of the microorganisms, thereby interfering to an extreme extent with the viability of these microorganisms.

It is therefore the principal object of the present invention to provide a novel and improved process for determining the microorganism content of air by filtering the air through a microporous air-permeable membrane having wholly new characteristics.

It is another object of the present invention to provide an accurate process for determining the microorganism content of air from the microorganisms accumulated upon a microporous air-permeable membrane through which the air has been passed.

It has been found that the objects of the present invention can be attained and the disadvantages that previously existed can be eliminated if the previously used cellulose ester membranes are replaced by membranes of a similar permeability but have as a base macromolecular water-soluble substances. These high molecular weight substances can be either of natural or synthetic origin. These substances must be soluble in water or in aqueous biologically compatible solutions.

Particular membranes which are suitable for determining the microorganism content of air are natural albumens such as gelatine, or synthetic substances such as polyvinyl alcohol and methyl cellulose.

It has been found that when membranes made of the foregoing substances are used as filters for air, all of the conditions necessary for an accurate determination of the microorganism content of the air are fulfilled, namely, (1) An accumulation or collection of microorganisms from the air passing through the membrane;
(2) Maintaining the viability of the accumulated microorganisms;
(3) The forming of cultures from these microorganisms so as to make possible the direct or indirect quantitative determination of the microorganism content of the air.

By forming these membranes with graduated degrees of fineness and corresponding permeability within predetermined limits, it is possible by a proper selection of the membrane to effect a quantitative separation of microorganisms of various sizes, such as bacteria, phages, and viruses. In order to collect such microorganisms, membranes are selected which might be termed as "bacteria" or "virus tight," membranes.

The physical characteristics of such membranes are such that the membranes can be described as microporous since they have pores with an average diameter of about 2 microns or less. The pore density is about $10^7$ pores per $cm.^2$ and the entire volume of the pores ranges from 80–85% of the volume of the membrane. The air permeability of such membranes ranges from 10 to 400 liters per 100 $cm.^2$ per minute under a 500 mm. column of water.

In contrast to the filtering of liquid media, in the filtering of air with membranes a direct relationship does not exist between the capacity of the membrane to retain microorganisms and the pore diameter of the membrane. This is true because the separation of the microorganisms from the air passing through the membrane is considerably increased by electrostatic forces. When dealing with air in which there is a low concentration of microorganisms, filters having a high air permeability and consequently large pores are employed so that comparatively large quantities of air can be passed through the membrane filters in a relatively short period of time.

A specific example will next be described in detail to demonstrate the manner in which the viability of the microorganisms collected on the membranes is preserved and serves to further describe the process according to the present invention. This example is for illustrative purposes only and is not to be considered limiting in any way the process of this invention.

*Example*

A gelatine membrane which had been sterilized in ethylene oxide and which had an air-permeability of about 250 liters per 100 $cm.^2$ per minute under a 500 mm. column of water and an average pore diameter of about 2 microns or less with a pore density of $10^7$ pores per $cm.^2$ was clamped in a stretched condition for filtration in a device which had been sterilized. Such devices are conventional and well known in the art. The pores of the membrane comprised 80–85% of the membrane volume and the membrane had a thickness of about 250 microns. The membrane had a surface weight of about 8 mg. per $cm.^2$ and a high mechanical solidity despite its porous structure.

The membrane was mounted so as to have an effective filter area of about 3 $cm.^2$. Twenty liters of air were then drawn through this membrane during a period of about 5 minutes under a subatmospheric pressure of about 250 mm. of a column of water. For comparative purposes a second membrane filter formed from a cellulose ester and having the same air-permeability as the gelatine membrane was also mounted in a filtration device and the same quantity of the air stream as set forth above was fed through an impinger. The following numbers were obtained by forming subsequent cultures of the air bacteria in a manner known per se.

Gelatine membrane _____ 480
Impinger _____ 500
Cellulose ester membrane _____ 8

From these figures it was apparent that the bacteria numbers of the impinger and the gelatine membranes were relatively close and were at a relatively high value as compared to the numbers obtained from the cellulose ester membrane. From this it can be concluded that the incubation properties of a microorganism obtained by retention on a gelatine membrane are not adversely affected as compared to the microorganisms through the impinger.

The membrane through which the air was filtered as described above, was then immersed in large laboratory test tubes with each test tube containing 30 ml. of a sterile biological salt solution or a nutrient broth. The test tube containing the membrane was then left in a water bath at a temperature of 30° C. for 30 minutes.

The contents of the test tube were then filtered through a cellulose ester membrane filter whose pores are of such a diameter that the membrane has a filtration rate of about 100 ml. $H_2O$ per 12.5 cm.$^2$ per 100 seconds at a pressure of 700 mm. of mercury.

After this filtration, the cellulose ester membrane was then placed in a Petri dish containing a nutrient substrate for incubation of the microorganisms with the membrane remaining in very close contact with the nutrient substrate. Examples of such nutrient substrates are as follows:

(1) Nutrient substrate standard agar for the determination of the total microorganism count.

Aqua dest. _____ml__ 1000
Peptone from meat trypticly digested _____g__ 10
Beef extract _____g__ 10
Sodium chloride _____g__ 5
Agar-agar _____g__ 20

These added substances are then dissolved in a water bath and the pH value adjusted to 7.8. The solution is sterilized by placing the same in an autoclave and then placed into the necessary Petri dishes.

(2) Preparation of a nutrient substrate for the determination of coliform microorganisms.

Yeast extract _____g__ 1.0
Peptone from meat trypticly digested _____g__ 4
Lactose _____g__ 5
$K_2HPO_4$ _____g__ 2
Aqua dest. _____ml__ 100
Agar-agar _____g__ 1.5

This mixture is then heated to 90° C. in a water bath and dissolved. There is then added to the dissolved mixture 4.5 ml. of 0.2% Tergitol solution and 2.5 ml. of 0.25% triphenyltetrazoliumchloride solution.

The solution is then filled into Petri dishes and incubation of the microorganisms is begun.

(3) Preparation of nutrient substances for the determination of yeast and mold fungi. The following components are dissolved in a water bath.

Biomalt extract _____g__ 12.0
Maltose _____g__ 1.0
$K_2HPO_4$ _____g__ 1.0
Aqua dest. _____ml__ 100
Agar-agar _____g__ 1.5

The pH value is adjusted to 4.8 and the solution sterilized in an autoclave and subsequently poured into Petri dishes for further use in incubation of microorganisms.

It is also possible that after the microorganisms have been accumulated on water-soluble membranes of gelatine or the like, the membrane can be made to swell for the purpose of identification and microorganism counting by adding aqueous liquid nutrient into the membrane. At the same time the swelled membrane can be used as half-solid nutrient substrates.

In order to obtain the desired cultures of the microorganisms various methods may be employed. After a retention of the microorganisms from the air upon the membrane has been completed by filtering the air through the membrane, the membrane with its accumulated microorganisms can be placed into a Petri dish which contains a quantity of an aqueous nutrient solution sufficient for swelling up the membrane. The membrane is then transformed into a semi-solid gelatinous nutrient substrate and can be used for producing cultures of microorganism colonies in an incubator in a manner known per se.

The membranes which have accumulated microorganisms thereon from air filtered therethrough can also be completely dissolved in bacteriological nutrient solutions or in pure water when the membrane itself is already a nutrient carrier. The liquid bacteria concentrate can also be admixed with gelatine or agar nutrient substrates known in the bacteriological art. The admixed bacteria concentrates can then be subjected to incubation to produce cultures.

A liquid bacteria concentrate can also be formed from the microorganisms retained on the membrane and then filtered through commerical membrane filters formed of cellulose esters. The filtered bacteria concentrate can then be cultivated by applying thereto a suitable nutrient media depending upon the microorganisms and the results desired all of which is well known in the art.

Because of the high dissolving properties of the membranes this process is not only possible to be carried out in vitro but also in vivo such, as by way of example, injecting the thus obtained bacteria concentrates into live animal organisms.

It will be understood that this invention is susceptible to modification in order to adapt it to different usages and conditions and, accordingly, it is desired to comprehend such modifications within this invention as may fall within the scope of the appended claims.

What is claimed is:

1. In a process for the determination of the microorganism content of air by means of air-permeable membranes, the steps of passing air containing microorganisms through a microporous air-premeable membrane having a base consisting essentially of a water-soluble substance selected from the group consisting of gelatine, polyvinyl alcohol and methyl cellulose and each membrane having pores with an average diameter of about 2 microns, a pore density of about $10^7$ pores per cm.$^2$, the entire volume of the pores ranging from 80–85% of the volume of the membrane and the air permeability of the membrane ranging from 10 to 400 liters per 100 cm.$^2$ per minute under a 500 mm. column of water, to accumulate microorganisms on the membrane, and forming cultures from the microorganisms accumulated on the membrane.

2. In a process for the determination of the microorganism content of air by means of air-permeable membranes, the steps of passing air containing microorganisms through a microporous air-permeable membrane having as a base a water-soluble substance selected from the group consisting of gelatine, polyvinyl alcohol and methyl cellulose and each membrane having pores with an average diameter of about 2 microns, a pore density of about $10^7$ pores cm.$^2$, the entire volume of the pores ranging from 80–85% of the volume of the membrane and the air permeability of the membrane ranging from 10 to 400 liters per 100 cm.$^2$ per minute under a 500 mm. column of water, to accumulate microorganisms thereon, and adding an aqueous liquid nutrient to the membrane and the microorganisms accumulated thereon to form a semi-solid nutrient substrate.

3. In a process for the determination of the microorganism content of air by means of air-permeable membranes, the steps of passing air containing microorganisms through a microporous air-permeable membrane having as a base a water-soluble substance selected from the group consisting of one of gelatine, polyvinyl alcohol and methyl cellulose and each membrane having pores with an average diameter of about 2 microns, a pore density of about $10^7$ pores per cm.$^2$, the entire volume of the pores ranging from 80–85% of the volume of the membrane and the air permeability of the membrane ranging from 10 to 400 liters per 100 cm.$^2$ per minute under a 500 mm. column of water, to accumulate microorganisms thereon, dissolving the membrane with the accumulated microorganisms thereon to obtain a microorganism suspension, and adding a nutrient to the microorganisms suspension to form cultures therefrom.

4. In a process for the determination of the microorganism content of air by means of air-permeable membranes, the steps of passing air containing microorganisms through a microporous air-permeable membrane having a base consisting essentially of a water-soluble substance selected from the group consisting of gelatine, polyvinyl alcohol and methyl cellulose and each membrane having pores with an average diameter of about 2 microns, a pore density of about $10^7$ pores per cm.$^2$, the entire volume of the pores ranging from 80–85% of the volume of the membrane and the air permeability of the membrane ranging from 10 to 400 liters per 100 cm.$^2$ per minute under a 500 mm. column of water, to accumulate microorganisms on the membrane, dissolving the membrane with the accumulated microorganisms thereon to obtain a microorganism suspension, filtering the microorganisms suspension through a cellulose ester membrane filter to make a quantitative determination of the microorganisms, and adding a nutrient to the microorganisms to form cultures therefrom.

5. In a process for the determination of the microorganism content of air by means of air-permeable membranes, the steps of mounting in a stretched condition a microporous membrane having as a base a water-soluble substance selected from the group consisting of gelatine, polyvinyl alcohol and methyl cellulose, and each membrane having pores with an average diameter of about 2 microns, a pore density of about $10^7$ pores per cm.$^2$, the entire volume of the pores ranging from 80–85% of the volume of the membrane and the air permeability of the membrane ranging from 10 to 400 liters per 100 cm.$^2$ per minute under a 500 mm. column of water, passing air containing microorganisms through the stretched membrane to accumulate microorganisms thereon, and forming cultures from the microorganisms accumulated on the membrane.

6. In a process for the determination of the microorganism content of air by means of air-permeable membranes, the steps of mounting in a stretched condition a microporous membrane having as a base a water-soluble substance selected from the group consisting of gelatine, polyvinyl alcohol and methyl cellulose, and each membrane having pores with an average diameter of about 2 microns, a pore density of about $10^7$ pores per cm.$^2$, the entire volume of the pores ranging from 80–85% of the volume of the membrane and the air permeability of the membrane ranging from 10 to 400 liters per 100 cm.$^2$ per minute under a 500 mm. column of water, passing air containing microorganisms through the stretched membrane to accumulate microorganisms thereon, forming cultures from the microorganisms accumulated on the membranes, and counting the cultures of microorganisms to determine the microorganism content of the air.

7. In a process for the determination of the microorganism content of air by means of air-permeable membranes, the steps of mounting in a stretched condition an air-permeable gelatine membrane having an average pore diameter of about 2 microns and a pore density of $10^7$ pores per cm.$^2$, the entire volume of the pores ranging from 80–85% of the volume of the membrane, and the air permeability of the membrane ranging from 10 to 400 liters per 100 cm.$^2$ per minute under a 500 mm. column of water, and soluble in a liquid from the group consisting of water and biologically compatible liquids, passing air containing microorganisms through the membrane at the flow rate of about 10–400 liters per cm.$^2$ per minute, and forming cultures from the microorganisms collected on the membrane.

8. In a process for the determination of the microorganism content of air by means of air-permeable membranes, the steps of mounting in a stretched condition a gelatine membrane sterilized in ethylene oxide and having an air permeability of about 250 liters per minute and a pore diameter of about 2 microns, a pore density of about $10^7$ per cm.$^2$, the entire volume of the pores ranging from 80–85% of the volume of the membrane, passing air containing microorganisms through the membrane at the flow rate of about 10–400 liters per cm.$^2$ per minute, and forming cultures from the microorganisms collected on the membrane.

References Cited by the Examiner

UNITED STATES PATENTS

| 2,672,432 | 3/1954 | Goetz | 195—103.5 |
| 2,689,199 | 9/1954 | Pesce. | |
| 2,761,813 | 9/1956 | Goetz | 195—103.5 |

A. LOUIS MONACELL, *Primary Examiner.*

ABRAHAM H. WINKELSTEIN, *Examiner.*

A. E. TANENHOLTZ, *Assistant Examiner.*